United States Patent [19]
Rovinsky

[11] Patent Number: 5,911,424
[45] Date of Patent: Jun. 15, 1999

[54] PORTABLE DOLLY

[76] Inventor: William Rovinsky, 212 Haypath Ave., Old Bethpage, N.Y. 11804

[21] Appl. No.: 08/452,431

[22] Filed: May 26, 1995

[51] Int. Cl.[6] ........................................................ B62B 3/12
[52] U.S. Cl. ...................................... 280/79.11; 280/655.1
[58] Field of Search ..................................... 280/639, 655, 280/655.1, 47.34, 47.371, 79.11, 79.3, 47.315

[56] References Cited

U.S. PATENT DOCUMENTS

| | | | |
|---|---|---|---|
| 1,879,214 | 9/1932 | Hallowell et al. | 280/79.11 |
| 2,070,095 | 2/1937 | Shepard, Jr. et al. | 280/79.11 |
| 3,488,062 | 1/1970 | Walda | 280/79.11 |
| 4,203,609 | 5/1980 | Mitchell et al. | 280/79.11 |
| 4,458,906 | 7/1984 | Lamson | 280/79.11 |
| 5,116,289 | 5/1992 | Pond et al. | 280/655.1 |
| 5,249,438 | 10/1993 | Rhaney et al. | 280/655 |
| 5,299,816 | 4/1994 | Vom Braucke et al. | 280/79.11 |
| 5,368,143 | 11/1994 | Pond et al. | 280/655.1 |
| 5,378,003 | 1/1995 | Burd et al. | 280/79.11 |
| 5,484,046 | 1/1996 | Alper et al. | 280/47.315 |
| 5,553,692 | 9/1996 | Sheiman | 280/655 |

FOREIGN PATENT DOCUMENTS

| | | | |
|---|---|---|---|
| 3502194 | 7/1986 | Germany | 280/79.11 |
| 0175567 | 7/1989 | Japan | 280/655.1 |
| 2043549 | 10/1980 | United Kingdom | 280/79.11 |

*Primary Examiner*—Brian L. Johnson
*Assistant Examiner*—Min Yu
*Attorney, Agent, or Firm*—Ilya Zborovsky

[57] ABSTRACT

A portable dolly, has a substantially horizontal platform having an upper surface and a lower surface, a plurality of wheels provided on the lower surface of the platform, and a handle connected with the platform so as to be turnable between a substantially horizontal position in which the handle is located in the vicinity of the platform substantially coextensive with it and a substantially vertical position in which the handle extends substantially perpendicularly to the platform, the platform being provided in the region of the upper surface with a groove formed so that when the handle is in the substantially horizontal position it does not extend upwardly beyond the upper surface of the platform.

15 Claims, 6 Drawing Sheets

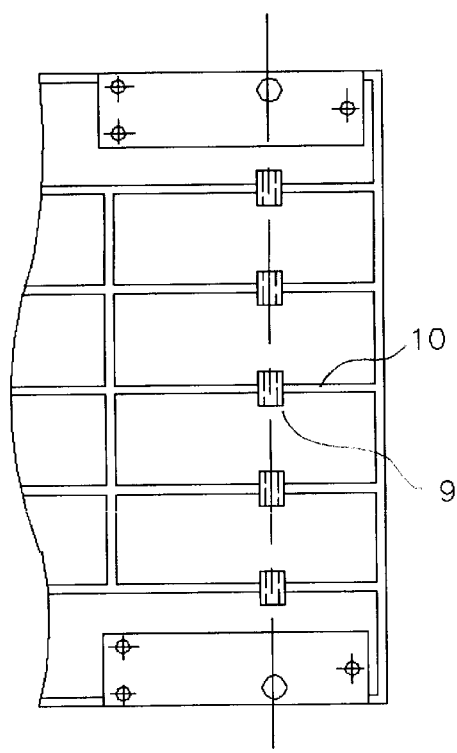
Fig.2
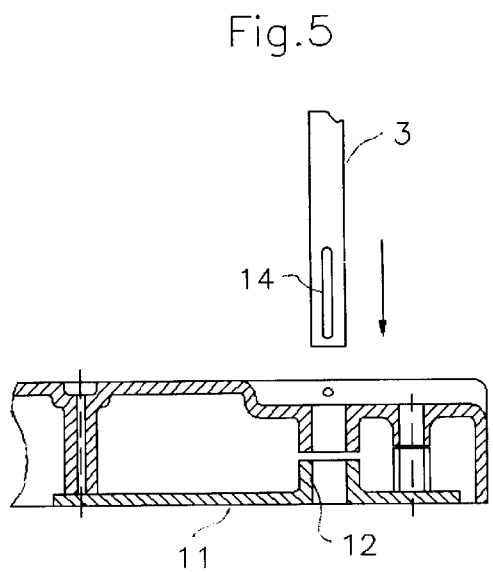
Fig.5
Fig.3
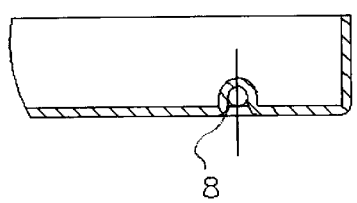
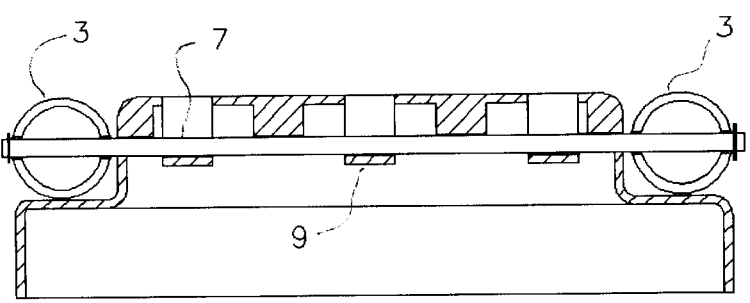
Fig.4

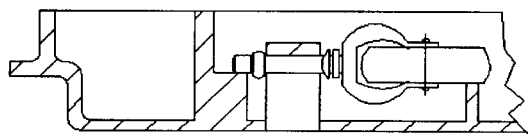
Fig.10
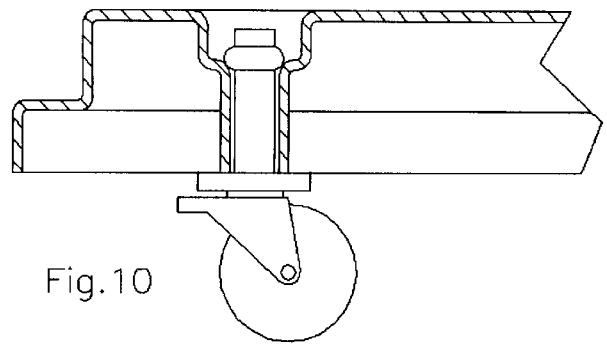
Fig.11
Fig.12
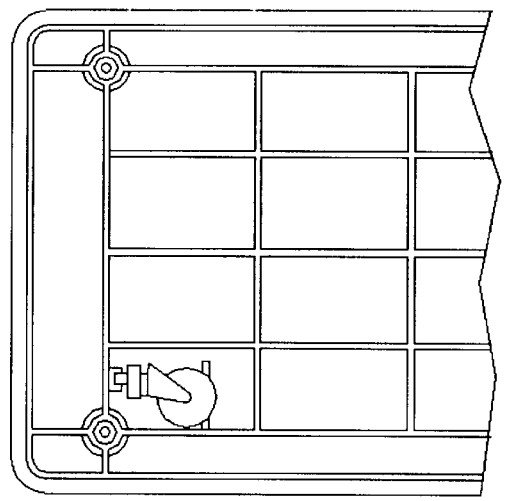
Fig.13
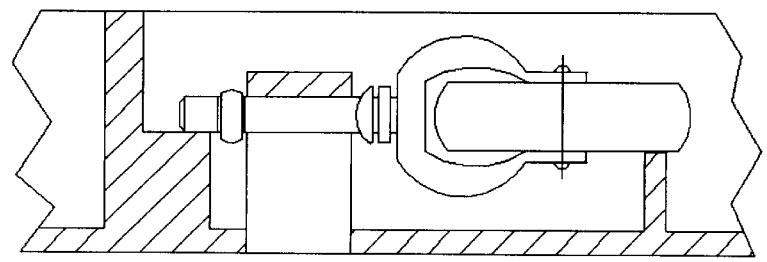

PORTABLE DOLLY

BACKGROUND OF THE INVENTION

The present invention relates to portable dollies.

Dollies are used for transporting objects such as, for example, pieces of furniture. Dollies are known in many modifications, usually they include a platform and a handle attached to the platform. One of such dollies is disclosed, U.S. Pat. No. 4,274,644. It is believed that dollies can be further improved in the sense of simplifying of their construction and manufacture, improving handling of the dollies and making them more portable.

SUMMARY OF THE INVENTION

Accordingly, it is an object of the present invention to provide a portable dolly which is a further improvemnet of the existing dollies.

In keeping with these objects and with others which will become apparent hereinafter, one feature of the present invention resides, briefly stated, in a portable dolly with a substantially horizontal platform having an upper surface and a lower surface, a plurality of wheels provided on said lower surface of said platform, and a handle connected with said platform so as to be turnable between a substantially horizontal position in which said handle is located in the vicinity of said platform substantially coextensive with it and a substantially vertical position in which the said handle extends substantially perpendicularly to said platform, said platform being provided in the region of said upper surface with a groove formed so that when said handle is in said substantially horizontal position it does not extend upwardly beyond said upper surface of said platform.

The new features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a partial bottom view of a platform of the portable dolly;

FIG. 3 is a side view of the portion shown on FIG. 2;

FIG. 4 is a view showing an area of a shaft for turning a handle of the portable dolly;

FIG. 5 is a view showing a portion of the platform with a handle insertable into an opening of the platform;

FIG. 7' is a magnified view of the dolly corner;

FIG. 10 is a view showing a portion of the platform with a wheel attached to it;

FIGS. 11 and 12 are a bottom view and a side view of the wheel in the folded condition;

FIGS. 13 and 14 are a side view and a perspective view of the folded wheel in accordance with another modification;

DESCRIPTION OF PREFERRED EMBODIMENTS

Figure 1:
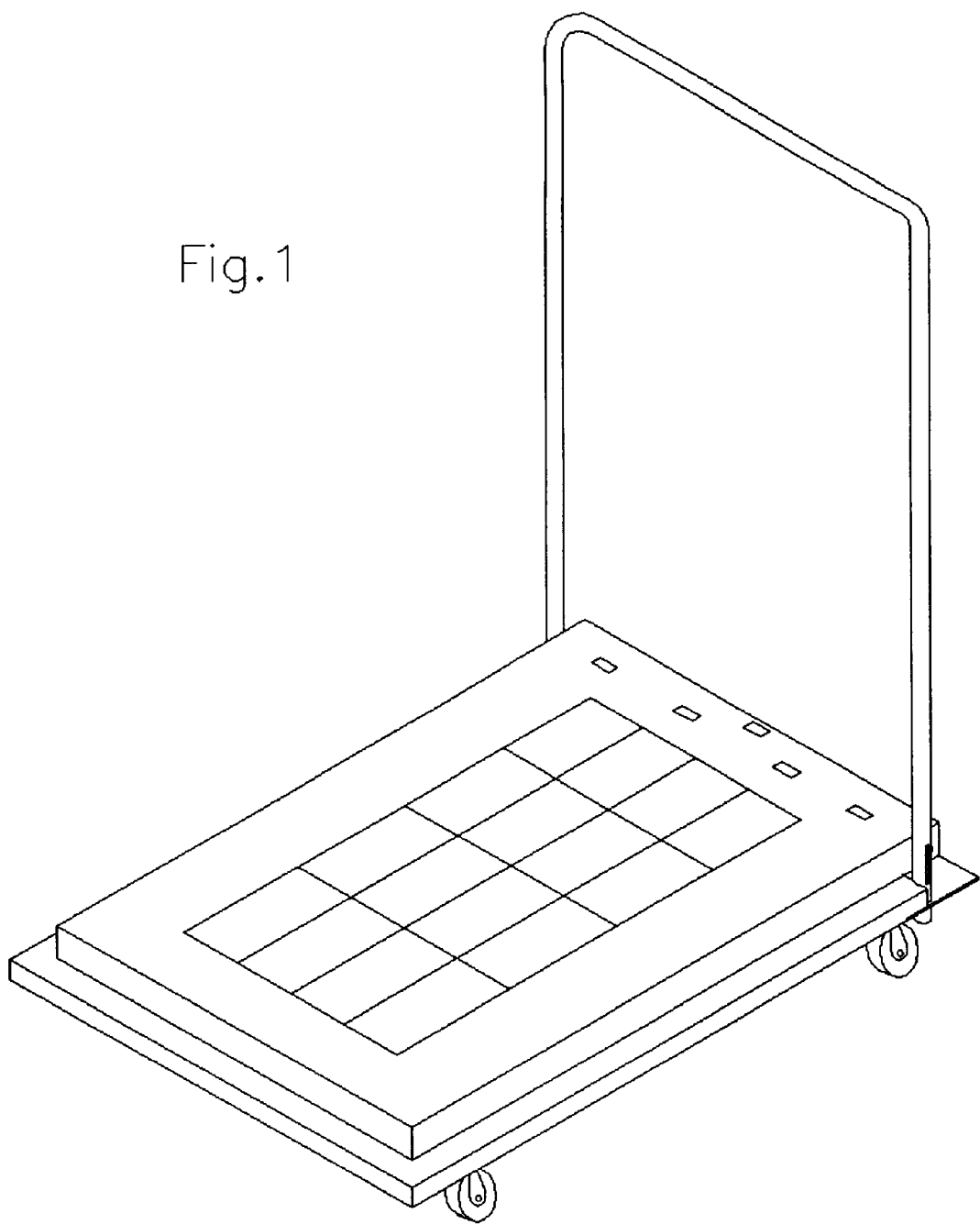
FIG. 1 is a perspective view of a portable dolly in accordance with the present invention.

A portable dolly in accordance with the present invention has a platform which is identified as a a whole as reference numeral 1, a plurality of wheels identified as reference numeral 2 and a handle identified as reference numeral 3.

The handle 3 is turnable relative to the platform 1 between a substantially horizontal position in which it is coextensive with the platform, and a substantially vertical position in which it extends substantially perpendicularly to the platform so that a user can hold the handle and move the dolly. The upper surface of the platform is provided with a groove identifed as reference numeral 4. The groove extends along three sides of the platform and is open upwardly and laterally as shown in FIG. 1. In the substantially horizontal position of the handle 3, the handle is received in the groove 4 so that it does not extend upwardly beyond the upper surface of the platform. A lateral projection 5 is provided between a lower part of the platform and an upper part of the platform. The groove 4 is formed between the projection 5 and the upper portion of the platform, and the projection 5 extends laterally beyond the lower portion of the platform so as to form a bumper for the dolly. It is to be understood that the projection 5 can be covered with an elastic material, for example, rubber. The platform is provided with an opening 6 in the region of the handle, so that in the folded position of the handle the dolly can be suspended on a hook or the like.

Figure 6:
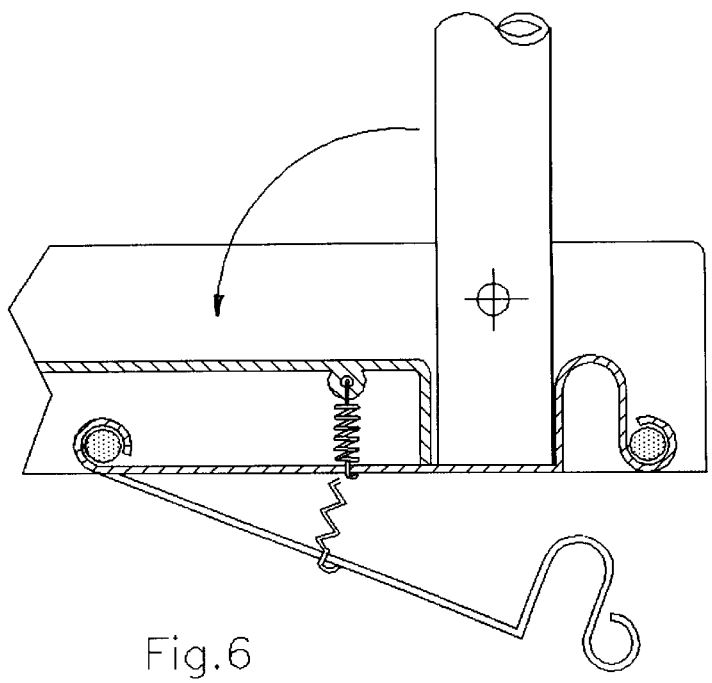
FIG. 6 is an enlarged view of the parts shown in FIG. 5.
Figure 7:
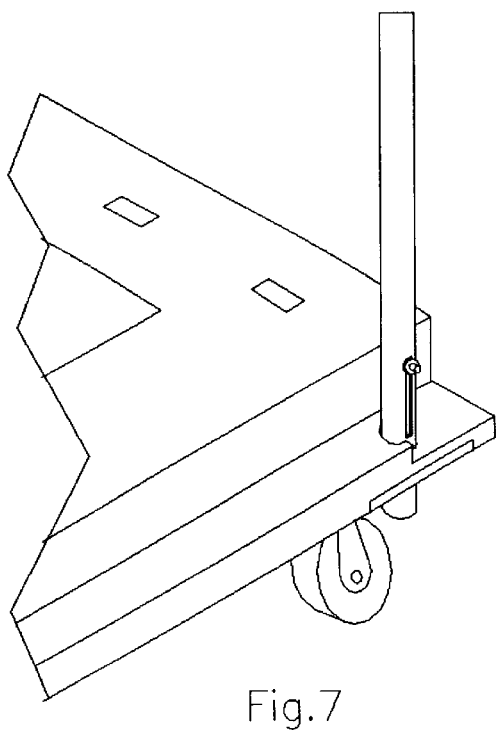
FIG. 7 is a perspective view of the parts of FIG. 5 and FIG. 6.
Figure 7:
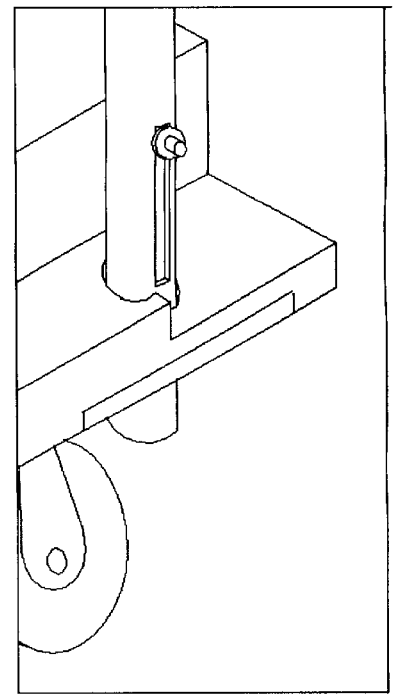
Figure 8:
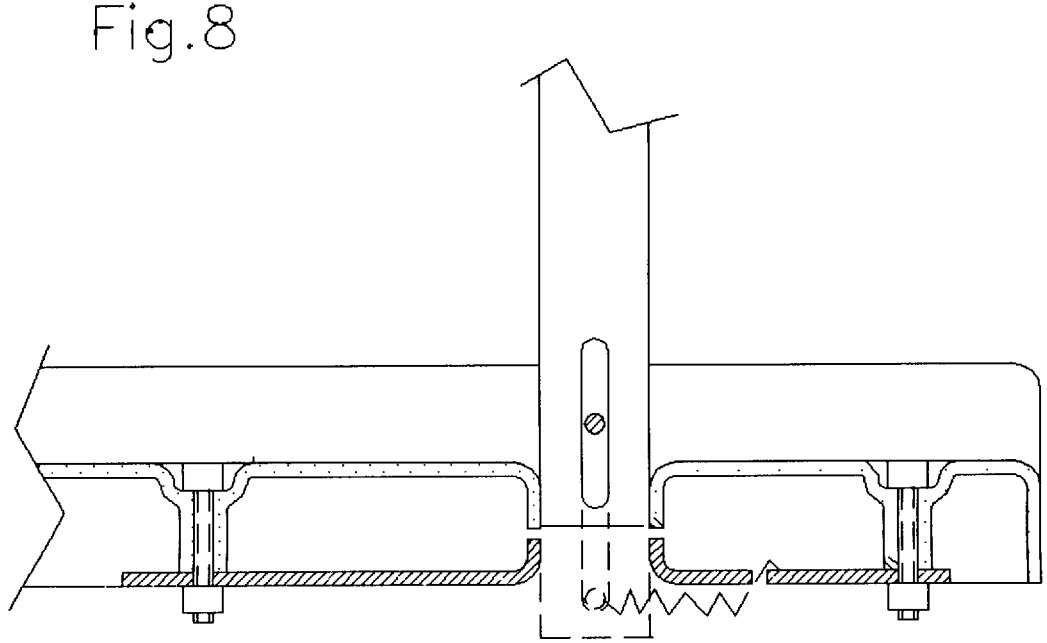
FIG. 8 is a view showing a portion of the platform with ends of the handle insertable into the same.

In order to turn the handle between the horizontal and vertical positions, a turnable shaft 7 is mounted on the lower surface of the platform. In particular, the shaft 7 extends through holes 8 formed in bushes 9 which are provided on the lower surface of the platform, in particular on reinforcing ribs 10 of the lower surface. While the platform can be composed of plastic, it is provided with reinforcing metal brackets 11 in the region of the ends of the U-shaped handle 3. In the vertical position of the handle, the lower ends of the handle are inserted in openings 12 provided in the platform and in the brackets. In this position the handle can be retained, for example, by a chain 13 which for turning the handle to the horizontal position can be disengaged by a user. The lower ends of the handle are provided with elongated slots 14 through which the shaft 7 extends. This allows the legs of the handle to move vertically and to engage into the above-mentioned openings 12 and then to be withdrawn from the openings to be turned to the horizontal position. The handle 3 can be reatined in its vertical position by a retaining element 15, shown in FIG. 6 and elastically engagable with a pin 16. When it is necessary to relieve the handle and to turn it to the horizontal position, a user presses with his foot the retaining element 15 downwardly and releases the lower end of the handle so that the handle can be turned as spring 17 holds the retaining element 15 in its retaining position.

Figure 14:
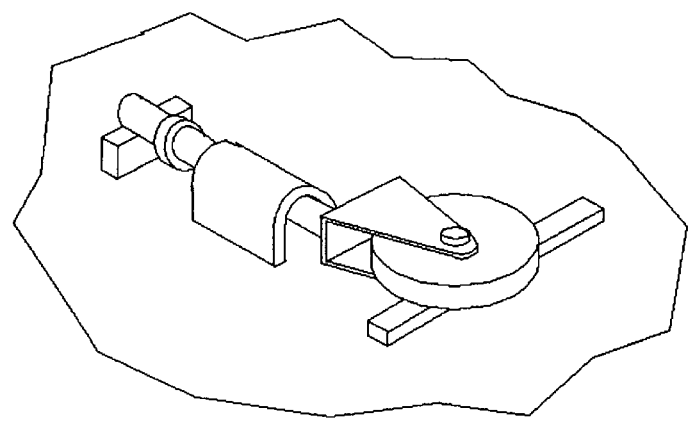
Figure 15:
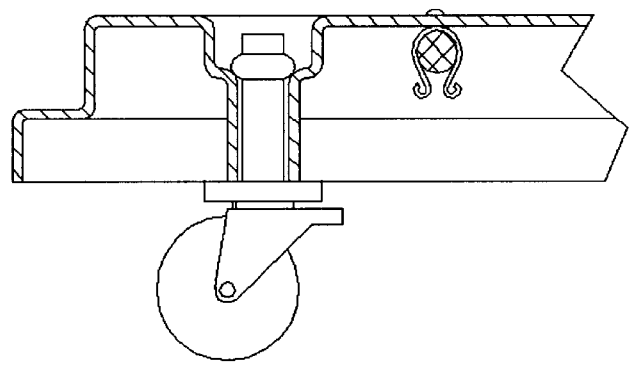
FIG. 15 is a view showing a further modification for holding the wheels in the storage condition.
Figure 16:
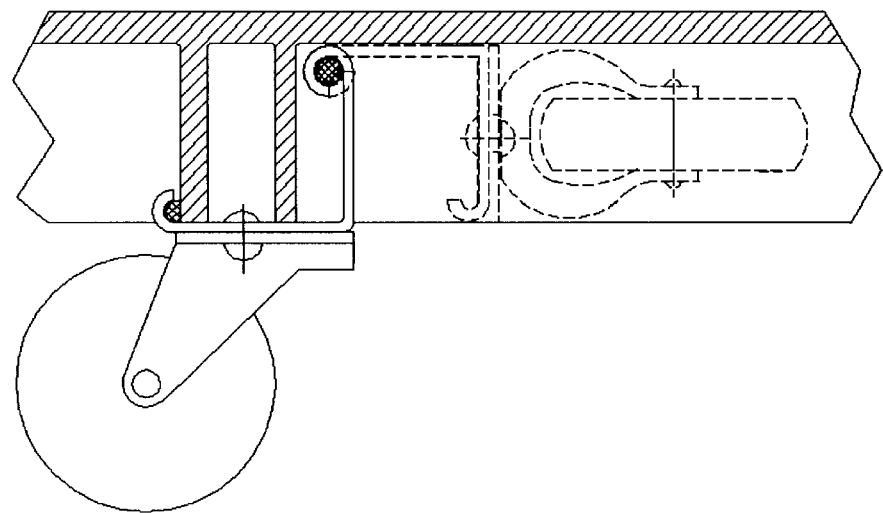
FIG. 16 shows a further modification of the invention.

The wheels 3 are formed as wheel casters each having a stem 18 insertable in an opening or socket 19 provided on the lower end of the platform and retained by a split elastic retaining ring 20. As can be seen from FIG. 11, each socket is formed at a point of intersection of ribs 21 provided on the lower surface of the platform. As shown in FIGS. 11 and 12, the wheel can be removed from the socket and placed in a horizontal position on the lower surface of the platform. In this position, the stem 18 of the wheel is passed through an opening in a bush 22 provided on the lower end of the platform, and the wheel itself is supported on a projection 23 arranged on the lower surface of the platform as shown in FIGS. 13 and 14. In accordance with another embodiment, the stem of the wheel can extend through a clip 24 provided on the lower surface of the platform, as shown in FIG. 15. Finally, in accordance with still another embodiment, the wheel 3 can be connected with a turnable L-shaped bracket 25 shown in FIG. 16. The bracket together with the wheel moves between a position shown in solid lines in which the wheels support the platform and a position shown in broken lines in which the wheel is turned into the interior of the flat platform to abut against its lower surface for storage. The bracket is turnable about a pivot 26 and arranged on it with a prestress so that in the storage position the bracket is retained horizontally under the action of the elastic property of the leg of the bracket interacting with the pivot 26.

Figure 9:
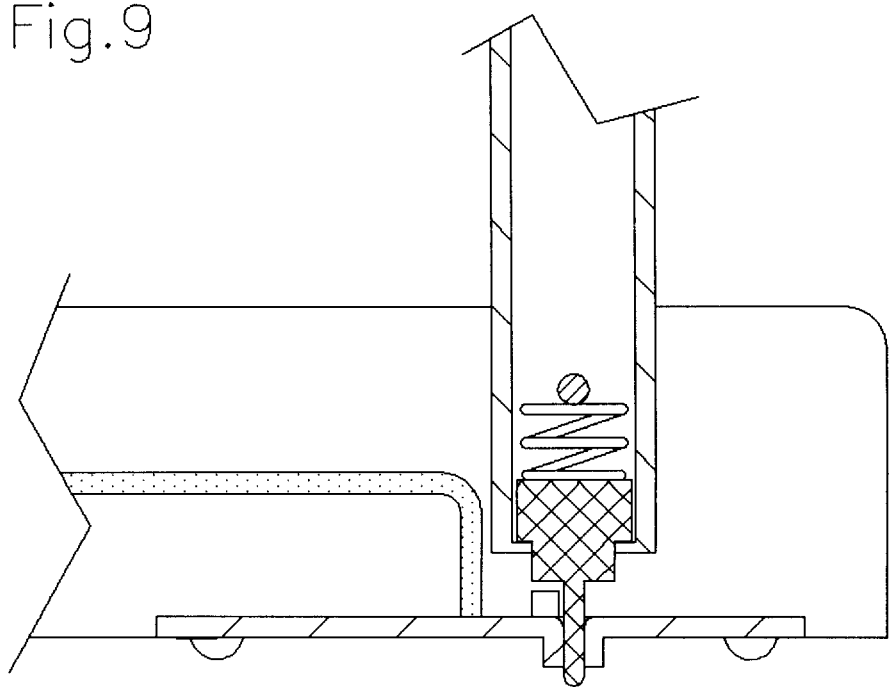
FIG. 9 is a view showing a further modification of the platform and handle interacting with one another.

Finally, the embodiment of FIG. 9 shows another possibility for holding the handle 3 in the vertical position. Here a slider 27 is located in each end of the bracket and has a projection 28 engagable in an opening of the metal bracket of the platform. The slider is spring-biased downwardly by a spring 29 and laterally abuts against an abutment member 30. For moving the handle 3 to the horizontal position, it is turned counterclockwise and the projection 28 disengages from the opening of the metal bracket with overcoming of the resistance of the spring 29.

It will be understood that each of the elements described above, or two or more together, may also find a useful application in other types of constructions differing from the types described above.

While the invention has been illustrated and described as embodied in a portable dolly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. A portable dolly, comprising a substantially horizontal platform having an upper surface and a lower surface; a plurality of wheels provided on said lower surface of said platform; and a handle connected with said platform so as to be turnable between a substantially horizontal position in which said handle is located in the vicinity of said platform substantially coextensive with it and a substantially vertical position in which said handle extends substantially perpendicularly to said platform, said platform being provided in the region of said upper surface with a groove formed so that when said handle is in said substantially horizontal position it extends at most up to said upper surface of said platform, said handle being substantially U-shaped and has two ends provided with elongated slots; and a shaft extending through said platform and through said slots of said handle so that said handle can be turned on said shaft relative to said platform between said substantially vertical and substantially horizontal positions, and also said handle is slidable vertically in said substantially vertical position to engage into said platform to be maintained in said substantially vertical position and then to disengage from said platform for turning to said substantially horizontal position.

2. A portable dolly as defined in claim 1, where said platform has four sides, said handle being arranged so that in said substantially vertical position, it is located in the region of one of said sides, said groove being provided in the other three of said sides.

3. A portable dolly as defined in claim 1, wherein said handle is substantially U-shaped and has two ends, said platform being provided with two substantially vertical openings so that in said substantially vertical position of said handle said ends extend through said substantially vertical openings.

4. A portable dolly as defined in claim 3, further comprising means for retaining said handle in said substantially vertical position when said ends of said handle are inserted in said substantially vertical openings, said retaining means being releasable by a user so as to allow turning of said handle from said substantially vertical position to said substantially horizontal position.

5. A portable dolly as defined in claim 1, wherein said lower surface of said platform has a plurality of reinforcing ribs provided with holes, said shaft extending through said holes of said reinforcing ribs.

6. A portable dolly as defined, in claim 1 wherein each of said wheels is movable between a substantially vertical position in which it supports said platform and a substantially horizontal position in which it is located on said lower surface of said platform for storage and transportation purposes.

7. A portable dolly as defined in claim 6, wherein said lower surface of said platform has retaining means for retaining each of said wheels in said substantially horizontal position.

8. A portable dolly as defined in claim 7, wherein said retaining means are formed as clamps provided on said lower surface on said platform.

9. A portable dolly as defined in claim 7, wherein said wheels are removable from said platform and then placeable on said lower surface of said platform so as to be moved from said substantially vertical position to said substantially horizontal position.

10. A portable dolly as defined in claim 7, further comprising means for supporting said wheels turnable about a substantially horizontal axis so that said wheels are turnable from said substantially vertical position to said substantially horizontal position and vice-versa around said turnably supporting means.

11. A portable dolly, as defined in claim 1, wherein said handle is U-shaped and has two ends; and further comprising spring biased locking means associated with each of said ends of said handle and arranged so that in said substantially vertical position said locking means is spring biased into the engagement of the platform to retain said handle is said substantially vertical position, and during turning of said handle towards the substantially horizontal position are disengaged from said platform.

12. A portable dolly as defined in claim 1, wherein said platform has an upper portion and a lower portion and substantially horizontal projection located between said upper portion and said lower portion said groove being formed between said substantially horizontal projection and said upper portion of said platform, said projection being formed to extend laterally beyond said platform so as to form a bumper for said platform.

13. A portable dolly as defined in claim 1, wherein said platform has an end portion provided with said handle, said end portion having an opening for suspending the dolly on a hook-shaped holder.

14. A portable dolly as defined in claim 1, wherein said platform has a lower surface provided with a plurality of reinforcing ribs and sockets arranged in points of intersection of said reinforcing rings, each of said wheel having a stem insertable into a respective on of said sockets.

15. A portable dolly, comprising a substantially horizontal platform having an upper surface and a lower surface; a plurality of wheels provided on said lower surface of said platform; and a handle connected with said platform so as to be turnable between a substantially horizontal position in which said handle is located in the vicinity of said platform substantially coextensive with it and a substantially vertical position in which said handle extends substantially perpendicularly to said platform, said platform being provided in the region of said upper surface with a groove formed so that when said handle is in said substantially horizontal position it extends at most up to said upper surface of said platform; and a shaft turnably mounted in said platform, said handle having two ends, each provided with an elongated slots, the shaft extending through said slots so that the handle can be turned on the shaft between said substantially vertical and horizontal positions.

* * * * *